United States Patent
Borkar

(10) Patent No.: US 11,783,841 B2
(45) Date of Patent: Oct. 10, 2023

(54) METHOD FOR SPEAKER AUTHENTICATION AND IDENTIFICATION

(71) Applicant: ILLUMA Labs Inc., Plano, TX (US)

(72) Inventor: Milind Borkar, Plano, TX (US)

(73) Assignee: ILLUMA LABS INC., Plano, TX (US)

( * ) Notice: Subject to any disclaimer, the term of this patent is extended or adjusted under 35 U.S.C. 154(b) by 264 days.

(21) Appl. No.: 17/201,987

(22) Filed: Mar. 15, 2021

(65) Prior Publication Data

US 2021/0201919 A1 Jul. 1, 2021

Related U.S. Application Data

(63) Continuation of application No. 16/385,511, filed on Apr. 16, 2019, now Pat. No. 10,950,244, which is a continuation-in-part of application No. 16/290,399, filed on Mar. 1, 2019, now Pat. No. 10,950,243, which is a continuation-in-part of application No. 16/203,077, filed on Nov. 28, 2018, now Pat. No. 10,832,683, said application No. 16/385,511 is a continuation-in-part of application No. 16/203,077, filed on Nov. 28, 2018, now Pat. No. 10,832,683.

(60) Provisional application No. 62/658,123, filed on Apr. 16, 2018, provisional application No. 62/638,086, filed on Mar. 3, 2018, provisional application No. 62/592,156, filed on Nov. 29, 2017.

(51) Int. Cl.
| | | |
|---|---|---|
| *G10L 17/16* | (2013.01) | |
| *G10L 17/04* | (2013.01) | |
| *G06F 17/16* | (2006.01) | |
| *G10L 17/02* | (2013.01) | |

(52) U.S. Cl.
CPC .............. *G10L 17/16* (2013.01); *G10L 17/04* (2013.01); *G06F 17/16* (2013.01); *G10L 17/02* (2013.01)

(58) Field of Classification Search
None
See application file for complete search history.

(56) References Cited

U.S. PATENT DOCUMENTS

| | | | |
|---|---|---|---|
| 9,208,777 B2 * | 12/2015 | Yao | G10L 15/063 |
| 9,491,167 B2 | 11/2016 | Talhami et al. | |
| 9,626,971 B2 * | 4/2017 | Rodriguez | G10L 17/14 |
| 10,074,089 B1 * | 9/2018 | Rangaraj | G06Q 20/40145 |
| 10,198,319 B1 * | 2/2019 | Sieklucki | G06F 11/1076 |
| 10,832,683 B2 | 11/2020 | Borkar | |
| 10,950,243 B2 | 3/2021 | Borkar | |

(Continued)

OTHER PUBLICATIONS

Reynolds, et al., "Robust Text-Independent Speaker Identification Using Gaussian Mixture Speaker Models", IEEE Transaction on Speech and Audio Processing, vol. 3, No. 1, Jan. 1995, pp. 72-83.

*Primary Examiner* — Douglas Godbold
(74) *Attorney, Agent, or Firm* — M&B IP Analysts, LLC

(57) ABSTRACT

A method and system for secure speaker authentication between a caller device and a first device using an authentication server are provided. The system comprises extracting features into a feature matrix from an incoming audio call; generating a partial i-vector, wherein the partial i-vector includes a first low-order statistic; sending the partial i-vector to the authentication server; and receiving from the authentication server a match score generated based on a full i-vector and another i-vector being stored on the authentication server, wherein the full i-vector is generated from the partial i-vector.

19 Claims, 12 Drawing Sheets

(56) References Cited

U.S. PATENT DOCUMENTS

| | | | | |
|---|---|---|---|---|
| 2002/0147588 A1* | 10/2002 | Davis | G10L 17/00 | 704/E17.003 |
| 2005/0131706 A1* | 6/2005 | Teunen | G10L 17/04 | 704/E17.006 |
| 2007/0071206 A1* | 3/2007 | Gainsboro | H04M 3/42221 | 379/168 |
| 2007/0198257 A1* | 8/2007 | Zhang | G10L 17/20 | 704/E17.008 |
| 2007/0277151 A1* | 11/2007 | Brunel | G06F 8/10 | 717/113 |
| 2014/0214417 A1* | 7/2014 | Wang | G10L 17/02 | 704/232 |
| 2014/0214420 A1* | 7/2014 | Yao | G10L 15/063 | 704/243 |
| 2014/0222428 A1* | 8/2014 | Cumani | G10L 17/02 | 704/250 |
| 2015/0058015 A1* | 2/2015 | Mitsufuji | G10L 21/003 | 704/243 |
| 2016/0042739 A1* | 2/2016 | Cumani | G10L 17/06 | 704/239 |
| 2016/0093304 A1* | 3/2016 | Kim | G10L 17/04 | 704/235 |
| 2017/0069313 A1* | 3/2017 | Aronowitz | G10L 19/02 | |
| 2017/0169815 A1* | 6/2017 | Zhan | G10L 15/07 | |
| 2017/0236520 A1* | 8/2017 | Borgstrom | G10L 17/12 | 704/239 |
| 2017/0351487 A1* | 12/2017 | Avilés-Casco Vaquero | G10L 17/00 | |
| 2017/0372706 A1* | 12/2017 | Shepstone | G10L 17/22 | |
| 2018/0166067 A1* | 6/2018 | Dimitriadis | G10L 15/04 | |
| 2018/0233140 A1* | 8/2018 | Koishida | G06N 20/00 | |
| 2019/0005962 A1* | 1/2019 | Martínez González et al. | G10L 17/02 | |
| 2019/0013013 A1* | 1/2019 | McLaren | G10L 15/063 | |
| 2019/0080697 A1* | 3/2019 | Grancharov | G10L 15/26 | |
| 2019/0130172 A1* | 5/2019 | Zhong | G06V 10/82 | |
| 2019/0279644 A1* | 9/2019 | Yamamoto | G10L 17/02 | |
| 2019/0304470 A1* | 10/2019 | Ghaemmaghami | G10L 21/0272 | |

* cited by examiner

METHOD FOR SPEAKER AUTHENTICATION AND IDENTIFICATION

CROSS-REFERENCE TO RELATED APPLICATIONS

This application is a continuation of U.S. patent application Ser. No. 16/385,511 filed on Apr. 16, 2019, now allowed, which claims the benefit of U.S. Provisional Application No. 62/658,123 filed on Apr. 16, 2018. The Ser. No. 16/385,511 application is a continuation-in-part (CIP) of:
a) U.S. patent application Ser. No. 16/203,077 filed on Nov. 28, 2018, now U.S. Pat. No. 10,832,683, which claims the benefit of U.S. Provisional Application No. 62/592,156 filed on Nov. 29, 2017; and
b) U.S. patent application Ser. No. 16/290,399 filed on Mar. 1, 2019, which claims the benefit of U.S. Provisional Application No. 62/638,086 filed on Mar. 3, 2018. The Ser. No. 16/290,399 application is also a continuation-in-part of the above-mentioned U.S. patent application Ser. No. 16/203,077 filed on Nov. 28, 2018, now U.S. Pat. No. 10,832,683.

All of the applications referenced above are hereby incorporated by reference.

TECHNICAL FIELD

The present disclosure relates generally to automatic speaker recognition systems and particularly to improved processing in automatic speaker recognition.

BACKGROUND

With an ever increasing use of voice technologies, speaker recognition and speech recognition are two fields of technology that are gaining rapid adoption due to various technological improvements. Applying statistical probabilistic models, such as Gaussian Mixture Models (GMM), is a known method for speaker and speech recognition. However, improvements with this technique are still desirable. Typically, this technique is resource intensive, using significant processor power and memory. Therefore, solutions which can reduce computation time, memory usage, and other resource requirements can provide a clear advantage over the prior art.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a for secure speaker authentication between a caller device and a first device using an authentication server. The method comprises extracting features into a feature matrix from an incoming audio call; generating a partial i-vector, wherein the partial i-vector includes a first low-order statistic; sending the partial i-vector to the authentication server; and receiving from the authentication server a match score generated based on a full i-vector and another i-vector being stored on the authentication server, wherein the full i-vector is generated from the partial i-vector.

Certain embodiments disclosed herein also include a method for securely authenticating a speaker between a caller device and a first device. The method comprises generating a user account including a user identifier based on at least one metadata element received from a caller device associated with an audio input; receiving a partial i-vector generated by the first device based on at least the audio input; generating a full i-vector based on the partial i-vector; and associating the user account with the full i-vector.

Certain embodiments disclosed herein also include a system for securely authenticating a speaker between a caller device and a first device. The system comprises a processing circuitry; and a memory, the memory containing instructions that, when executed by the processing circuitry, configure the system to: generate a user account including a user identifier based on at least one metadata element received from a caller device associated with an audio input; receive a partial i-vector generated by the first device based on at least the audio input; generate a full i-vector based on the partial i-vector; and associate the user account with the full i-vector.

Certain embodiments disclosed herein also include a system for securely authenticating a speaker between a caller device and a first device. The system comprises a processing circuitry; and a memory, the memory containing instructions that, when executed by the processing circuitry, configure the system to: generate a user account including a user identifier based on at least one metadata element received from a caller device associated with an audio input; receive a partial i-vector generated by the first device based on at least the audio input; generate a full i-vector based on the partial i-vector; and associate the user account with the full i-vector.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
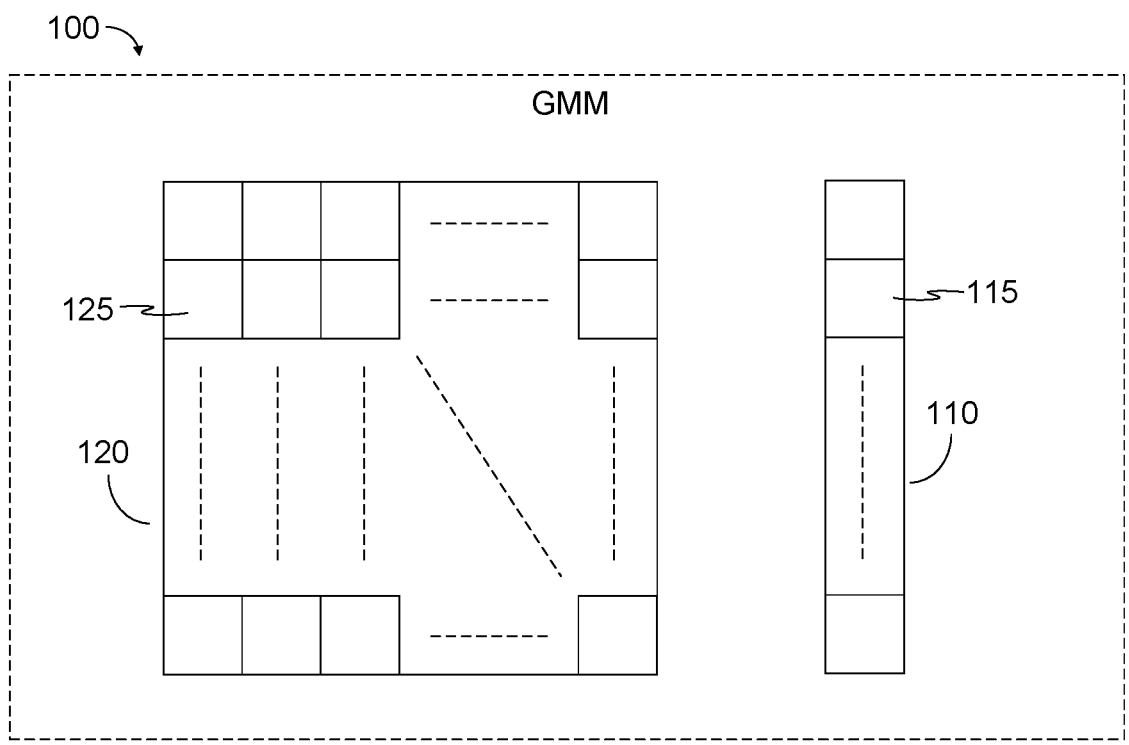
FIG. 1 is an example schematic illustration of a Gaussian Mixture Model (GMM), according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Voice authentication and identification systems typically require expensive processing power and may fail to observe privacy related requirements. This application discloses a system which is able to perform at least a portion of these functions locally on an end device, utilizing optimized computations. Performing these functions at least partially on an end device may result in increased security and increased privacy.

FIG. 1 is an example schematic illustration of a Gaussian Mixture Model (GMM) 100, according to an embodiment. A GMM 100 is a weighted sum of 'n' component densities, where 'n' is an integer equal to or greater than 1, which may be represented by the following equation:

$$p(\vec{x}|\lambda) = \sum_{i}^{n} w_i f_i(\vec{x})$$

where $\vec{x}$ is a vector of D dimension, $f_i(\vec{x})$ are component densities, and $w_i$ are mixture weights. Each component density can be represented as a function, for example as the following equation:

$$f_i(\vec{x}) = \frac{1}{(2\pi)^{\frac{D}{2}} |\Sigma_i|^{\frac{1}{2}}} e\left\{-\frac{1}{2}(\vec{x} - \vec{\mu}_i)' \Sigma_i^{-1} (\vec{x} - \vec{\mu}_i)\right\}$$

where $\vec{\mu}_i$ is a mean vector and $\Sigma_i$ is a covariance matrix. The mean vectors, weights and covariance matrices are all parameters of a GMM.

The GMM 100 may be stored as a data structure for computer processing. In some embodiments, a weight vector that controls each component density may be implemented. For example, a mean vector 'i' 110 may be stored as an array of 1 by D cells, where each cell, such as cell 115, holds a specific value (such as an integer, floating point, and the like). Likewise, a covariance matrix 'i' 120 may be stored as an array of 'D' by 'D' cells, such as cell 125, where each cell holds a specific value (such as integers, floating point, and the like), where D is the dimension, i.e., number of coefficients, and 'i' is one of the 'n' GMM components.

A GMM 100 may have a covariance matrix for each component, i.e., for every i of $w_i f_i(\vec{x})$, one covariance matrix per speaker model, or a single covariance matrix for the whole GMM 100. The covariance matrix 120 may be full or diagonal. In certain embodiments, a covariance matrix including only diagonal elements may be stored in memory as a vector, in order to decrease memory usage.

A speaker $\lambda$ may be represented by the above parameters, i.e., mean vectors, weights and covariance matrices, or by changes thereto (i.e., related delta vectors or matrices). A GMM 100 may be used as a Universal Background Model (UBM) for speaker recognition. However, in order to properly identify speakers, the UBM must be trained with a dataset. A trained model is able to estimate the parameters of $\lambda$ which are a best match of the distribution of the training feature matrices. An example of a technique for estimating the parameters of a GMM is the maximum likelihood (ML) estimation. For a sequence of T training vectors X= $\{\vec{x}_1, \ldots, \vec{x}_T\}$ the GMM likelihood can be expressed as follows:

$$p(X|\lambda) = \prod_{t=1}^{T} p(\vec{x}_t|\lambda)$$

which is a nonlinear function and therefore direct maximization is not possible. ML parameters can however be obtained by the expectation-maximization (EM) algorithm.

The EM algorithm is iterative, and the following equations may be used:

Mixture Weights:

$$\bar{w}_i = \frac{1}{T} \sum_{t=1}^{T} p(i|\vec{x}_t, \lambda)$$

Means:

$$\vec{\mu}_i = \frac{\sum_{t=1}^{T} p(i|\vec{x}_t, \lambda) \vec{x}_t}{\sum_{t=1}^{T} p(i|\vec{x}_t, \lambda)}$$

Variances:

$$\bar{\sigma}_i^2 = \frac{\sum_{t=1}^{T} p(i|\vec{x}_t, \lambda) x_t^2}{\sum_{t=1}^{T} p(i|\vec{x}_t, \lambda)} - \bar{\mu}_i^2$$

where the a posteriori probability for acoustic class i is given by:

$$p(i|\vec{x}_t, \lambda) = \frac{w_i b_i(\vec{x}_t)}{\sum_{k=1}^{M} w_k b_k(\vec{x}_t)}$$

Figure 2:
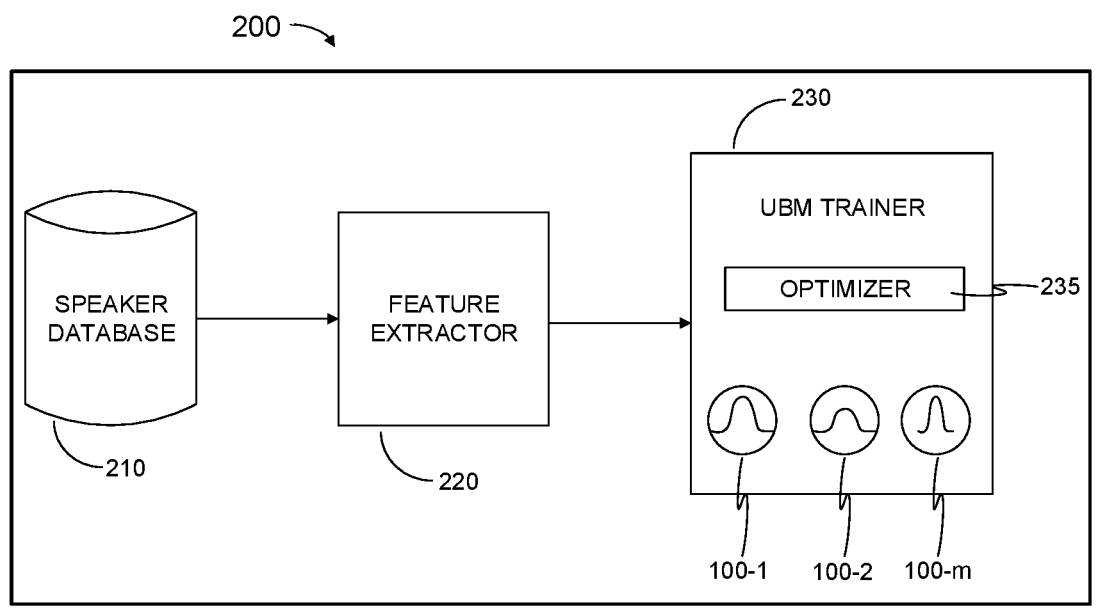
FIG. 2 is an example block diagram of a Universal Background Model (UBM) trainer for training GMMs of a Universal Background Model, according to an embodiment.

FIG. 2 is an example block diagram of a UBM trainer 200 for training GMMs of a Universal Background Model, according to an embodiment. A speaker database 210 provides a training set of audio samples. Preferably the audio samples include a diverse sample group. A diverse sample group may include male and female speakers, speech over narrowband phone lines, high quality wideband speech, voice over IP (VoIP) samples, background noise, channel noise, and the like.

A feature extractor 220 is connected to the speaker database 210. The feature extractor 220 is configured to extract voice-related features from an audio sample (also referred to as audio signal herein). In one exemplary embodiment, the feature extractor 220 is configured to extract mel-frequency cepstral coefficients (MFCCs). The mel scale is a perceptual scale of pitches which to human listeners sound as being of equal distance from one another. The mel frequency cepstrum is a representation of the short-term power spectrum of a sound sample, based on a linear cosine transform of a log power spectrum on a nonlinear mel scale of frequency. The MFC coefficients therefore, are derived from a cepstral representation of a sound (or voice) sample.

In an embodiment, MFCCs are derived by computing, for a section of an audio signal (e.g., a 50 millisecond time window), the Fourier transform of an audio signal. Using triangular overlapping windows, a map is generated of the powers of the spectrum of the audio signal onto the mel scale. A logarithm of the powers at each mel frequency is then computed, and a discrete cosine transform is generated for the mel logarithm powers, where the MFC coefficients are the amplitudes of the resulting spectrum. A cepstrum is the result of computing an inverse Fourier transform of the logarithm of the estimated spectrum of a signal, in this case an audio signal.

The feature extractor 220, also referred to in an exemplary and non-limiting manner herein as MFCC extractor 220, may generate MFC coefficients by receiving an audio signal from the speaker database 210, performing a computation for generating the MFC coefficients (e.g., as described above with partially overlapping frames), and storing them to a storage or memory device, e.g., in a matrix form. In some embodiments, additional coefficients may be generated as delta coefficients (and delta-delta coefficients, which are a derivative of delta coefficients), which capture the rate of change in MFCCs of consecutive audio frames (which may or may not overlap). In yet another example, the feature extractor may include a neural network which receives an audio frame as an input, and outputs a vector of 'D' features, each feature significant of the audio frame.

A UBM trainer 230 receives the MFCC vectors and uses them as a training input for one or more GMMs, such as GMM 100-1 through 100-$m$ (where '$m$' is an integer equal to or greater than 2), stored therein. In an embodiment, the UBM trainer 230 includes a resource optimizer 235, discussed in more detail with respect to FIG. 4. The speaker database 210, feature extractor 220, and UBM trainer 230 may be implemented as one or more computer devices, communicatively coupled with each other, so that the feature extractor 220 is coupled with both the speaker database 210 and the UBM trainer 230.

Figure 3:
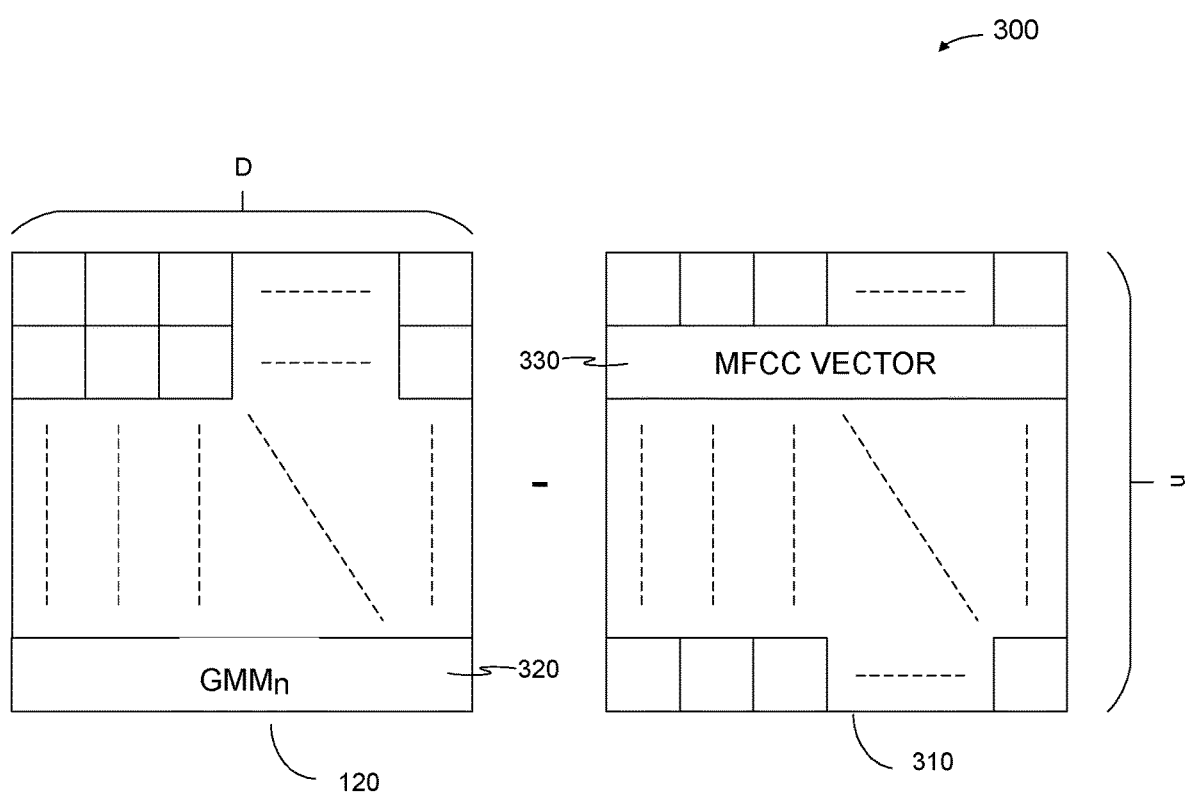
FIG. 3 is a schematic illustration of a matrix of a GMM means and an exemplary mel-frequency cepstral coefficients (MFCC) matrix used for training a UBM, according to an embodiment.

FIG. 3 is a schematic illustration of a matrix of a GMM means and an exemplary MFCC matrix used for training a UBM, according to an embodiment. A UBM trainer, e.g., UBM trainer 230 of FIG. 2, may receive 'n' 'D' by 'D' GMM component covariance matrices (or an 'n' by 'D' matrix of GMM component variances, in case of diagonal covariance matrices), an 'n' by 'D' matrix of GMM component means 120, an 'n' by '1' vector of GMM component weights, a generated '1' by 'D' feature vector 330, and/or a generated 'T' by 'D' matrix of a plurality of feature vectors, as an input, where 'T' is the number of audio frames.

In order to train a UBM, each GMM component means is compared to each feature vector (e.g., MFCC vector) to generate a delta vector. A computation is then performed between the delta vector, inverse covariance matrix, and a Hermitian transposed delta vector. The result of the computation may be scaled with an associated GMM component weight vector. This step is repeated for every combination of GMM component means and each feature vector extracted from each of the audio frames, which may be overlapping in some embodiments, or a combination of overlapping and non-overlapping audio frames. The UBM trainer may then use these computations to update each of the GMM components (weights, means and covariances).

Such computations are resource intensive, using processor power and memory. Additionally, often they involve performing redundant computations, non-impact computations (always equal to zero, for example), and the like. Optimizing these computations is therefore beneficial and provides advantages in generating a robust speaker recognition model.

As discussed in more detail below, and in order to decrease computational time, a matrix of GMM component means may be generated, having a dimension of 'n' (number of GMM components) by 'D' (number of dimensions). For each audio frame, a matrix of 'n' by 'D' may be generated, by replicating each MFCC vector (a vector having 'D' elements) 'n' times. A delta matrix is then generated between each MFCC matrix (per frame) and GMM component mean matrix. In this exemplary schematic illustration, the UBM trainer 230 compares the duplicated feature vector, such as feature vector 330 to each GMM component mean, such as GMM component 320, to generate a delta matrix. A product is generated from the delta matrix, the inverse covariance matrix, and Hermitian transposed delta matrix used to generate an updated mean vector of the GMM, and in some embodiments, an updated covariance and/or updated weight vector.

Figure 4:
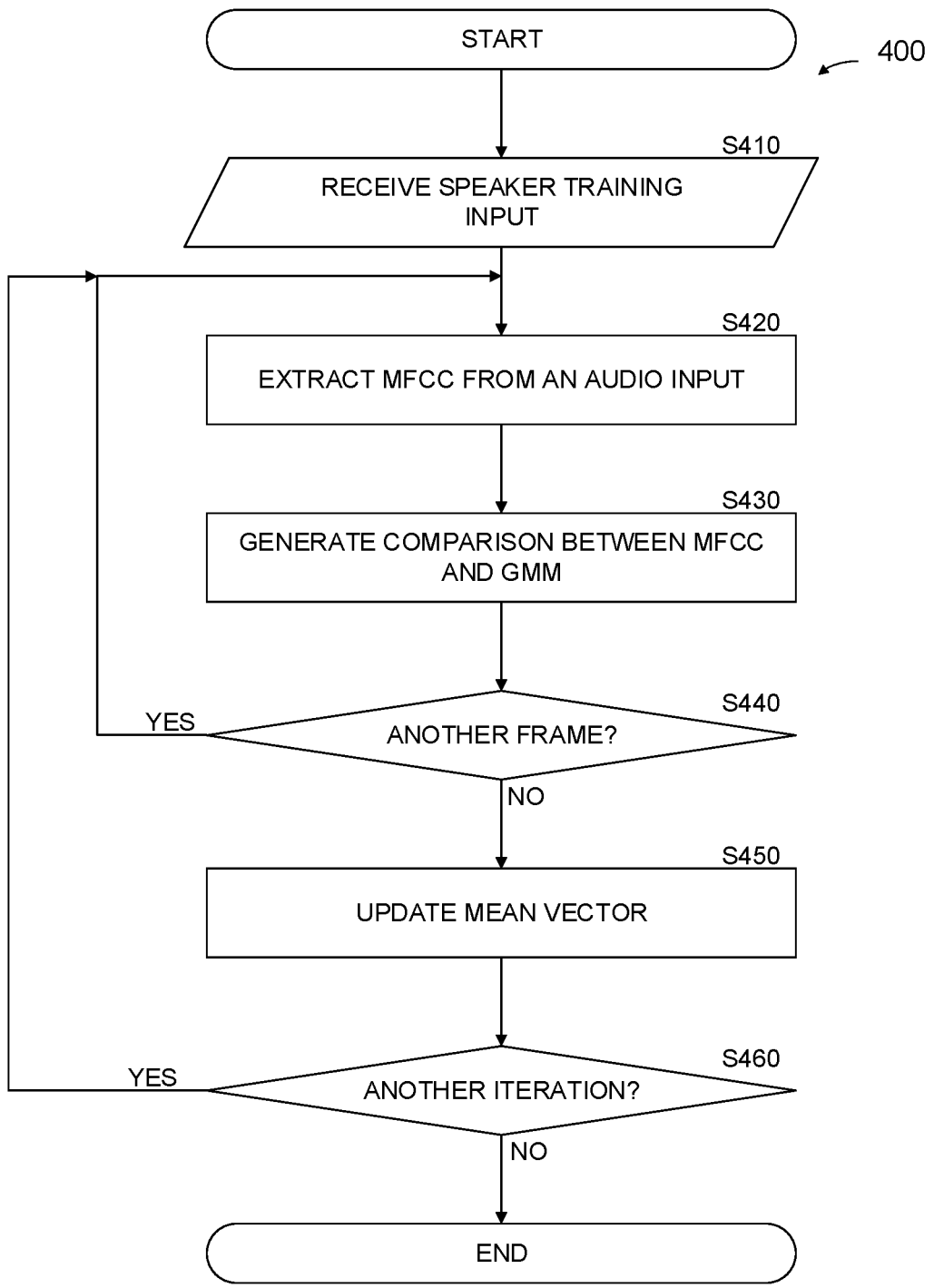
FIG. 4 is an example flowchart of a method for training a universal background model for speaker recognition, according to an embodiment.

FIG. 4 is an example flowchart 400 of a method for training a universal background model for speaker recognition, according to an embodiment. In one embodiment, the UBM trainer and feature extractor are implemented as a single machine.

At S410, an audio input is received, e.g., by a UBM trainer, such as UBM trainer 230 of FIG. 2. The audio input includes at least an audio sample, e.g., of a human speaker, the sample having a length above a threshold. A sample which is too short may not contain enough information therein to have significant input on the GMM, and may therefore be excluded.

At S420, a feature vector is generated, for example by extracting at least one audio feature. In an embodiment, an MFCC extractor is used, where MFC coefficients are generated from the audio input, and stored in a matrix data structure, as detailed throughout this disclosure. In this embodiment the feature extractor used to generate the feature vector is an MFCC extractor for pedagogical purposes only, and it is understood by those skilled in the art that other feature extractors may be used without departing from the scope of this disclosure.

At S430, a comparison (e.g., a delta) is generated between a generated MFCC matrix and a matrix of GMM component means. The MFCC matrix may include an MFCC vector duplicated to 'n' rows (where 'n' is the number of GMM components) which is compared (per frame) with a plurality of GMM components. The GMM components may include weights, means and covariances.

At S440, a check is performed to determine if another frame should be processed. In some embodiments, a plurality of frames are processed for each audio input. In certain embodiments, the plurality of audio frames include some overlap, the amount of which may be predefined. If an additional frame, which may be a consecutive frame, is to be processed, execution continues at S420; otherwise execution continues at S450.

At S450, a mean vector associated with the covariance matrix is updated based on the generated comparisons of S430. The updated mean vector may be stored in place of the previous mean vector. In some embodiments, the weights and covariances may also be updated based on the generated comparison.

At S460, a check is performed to determine if another training iteration should be processed, e.g., by the UBM trainer. If so, execution continues at S410; otherwise execution ends.

Typically a plurality of audio inputs related to a diverse speaker population are selected, and these audio inputs are used for training the UBM in multiple iterations. This method of training a UBM may be resource intensive. To overcome this, at S430 the UBM trainer may select a resource optimizer. A resource optimizer may initiate a first optimization by instructing the processor to generate any product of the covariance matrix (e.g., multiplying the delta matrix and inverse covariance matrix), by eliminating the diagonal covariance matrix data structure. Rather than instructing a processor of the UBM trainer to process the product of two matrixes in a naïve manner, the resource optimizer may instruct the processor to only compute those values where the diagonal elements of the covariance matrix are involved. Thus, the processor avoids performing a plurality of calculations which would merely yield a zero result. By avoiding processing these data values, the UBM trainer uses less processor resources, and less memory is required to generate intermediate computations and store results, as only meaningful (e.g., non-zero) results are stored.

In some embodiments, the resource optimizer may initiate a second optimization. While one approach involves comparing each MFCC frame, usually via a loop structure (such as a "for" loop) with a plurality of GMMs, such that each instance of the loop generates a comparison between a single one of the GMM components to the current MFCC frame, this can be resource intensive. A second optimization may include generating new data structures comprising a plurality of GMM components, also referred to as a multi-dimensional data array. The multi-dimensional data arrays may include two or more of the GMM components. Such data structures may be of a data size of 'n' by '1' for GMM weights, and 'n' by 'D' for GMM means and covariances, where 'n' is an integer equal to the number of GMM components, and 'D' is an integer equal to the number of coefficients in each MFCC frame. The resource optimizer may then instruct the processor to execute necessary computations between the multi-dimensional data arrays, and a MFCC matrix generated by replicating the current MFCC vector (relating to a single audio frame) in a 'n' by 'D' matrix.

In certain computing environments, this single cycle calculation may be performed by the processor faster than executing multiple cycles ("for" loop) each having a single calculation. In some embodiments, the resource optimizer may initiate a third optimization by instructing a general purpose GPU (GPGPU), or other type of parallel processor, to perform this computation. For example, as there is a computation performed which involves two identical GMM components, it may be advantageous to perform a computation between each MFCC matrix (which are different from one another) and the GMM data structures (which are the same for multiple MFCC Matrices) in parallel threads.

In a further embodiment, the resource optimizer may initiate a fourth optimization. The fourth optimization includes identifying all intermediate matrix results that need to be diagonalized, and eliminating the computation of all off-diagonal elements. By eliminating the computation of off-diagonal matrix elements, the resource optimizer allows the processor to reduce computation cycles while simultaneously saving memory space by not storing results of computations which would not factor in to the end result in an impactful way.

In a further embodiment, the resource optimizer may initiate a fifth optimization, which includes detecting common precomputable elements in the required computations between GMM data structures and the MFCC matrix. The resource optimizer may detect a recurring computation and generate a precomputed value for such recurring computations. The precomputed value may be stored, e.g., in a storage, for future reference. For example, a recurring computation can occur within a loop. By detecting such recurring computations (and for example storing them in a processor cache), generating a product outside of the loop and using the product within the loop, the processor performs less calculations per loop cycle, thereby reducing computation and decreasing total processing time. In certain embodiments, the resource optimizer may perform any one or more of the optimizations.

Figure 5:
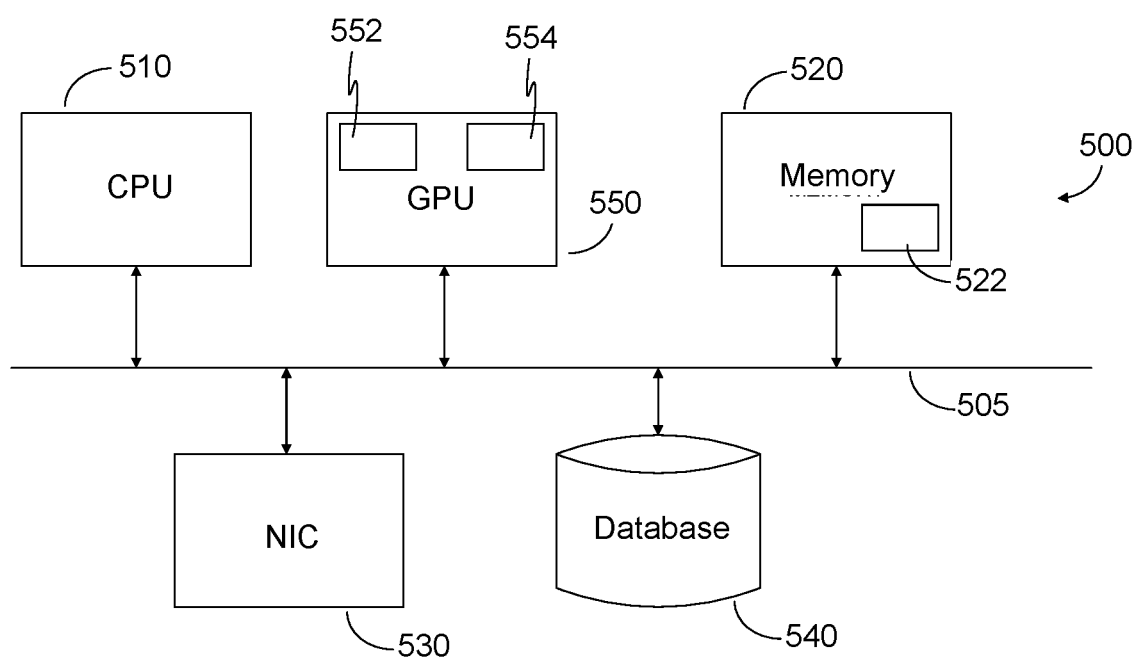
FIG. 5 is an example block diagram of a UBM Training System implemented according to an embodiment.

FIG. 5 is an example block diagram of a UBM Training System 500 implemented according to an embodiment. The system 500 includes at least one processing circuitry 510, for example, a central processing unit (CPU). In an embodiment, the processing circuitry 510 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 510 is coupled via a bus 505 to a memory 520. The memory 520 may include a memory portion 522 that contains instructions that when executed by the processing circuitry 510 performs the method described in more detail herein. The memory 520 may be further used as a working scratch pad for the processing circuitry 510, a temporary storage, and others, as the case may be. The memory 520 may be a volatile memory such as, but not limited to random access memory (RAM), or non-volatile memory (NVM), such as, but not limited to, flash memory.

The processing circuitry 510 may be further connected to a network interface controller 530, which provides the system 500 with connectivity to a network. The network may provide connectivity to various devices, such as a speaker database, feature extractor, and the like. In some embodiments, the speaker database, feature extractor and UBM training system may be implemented on a single machine. In an embodiment, the network may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity.

The processing circuitry 510 may be further connected to a database 540. The database 540 may be used for the purpose of holding a copy of the method executed in accordance with the disclosed technique. The database 540 may also store therein a plurality of GMM components. In some embodiments, the system 500 includes a storage (not shown) for storing thereon audio recordings, as part of a speaker database.

The bus 505 may further connect a general purpose graphics processing unit (GPGPU) 550. The GPGPU 550 may include a plurality of computational cores, such as first core 552 and second core 554. The processing circuitry 510, the GPGPU 550, and/or the memory 520 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 6:
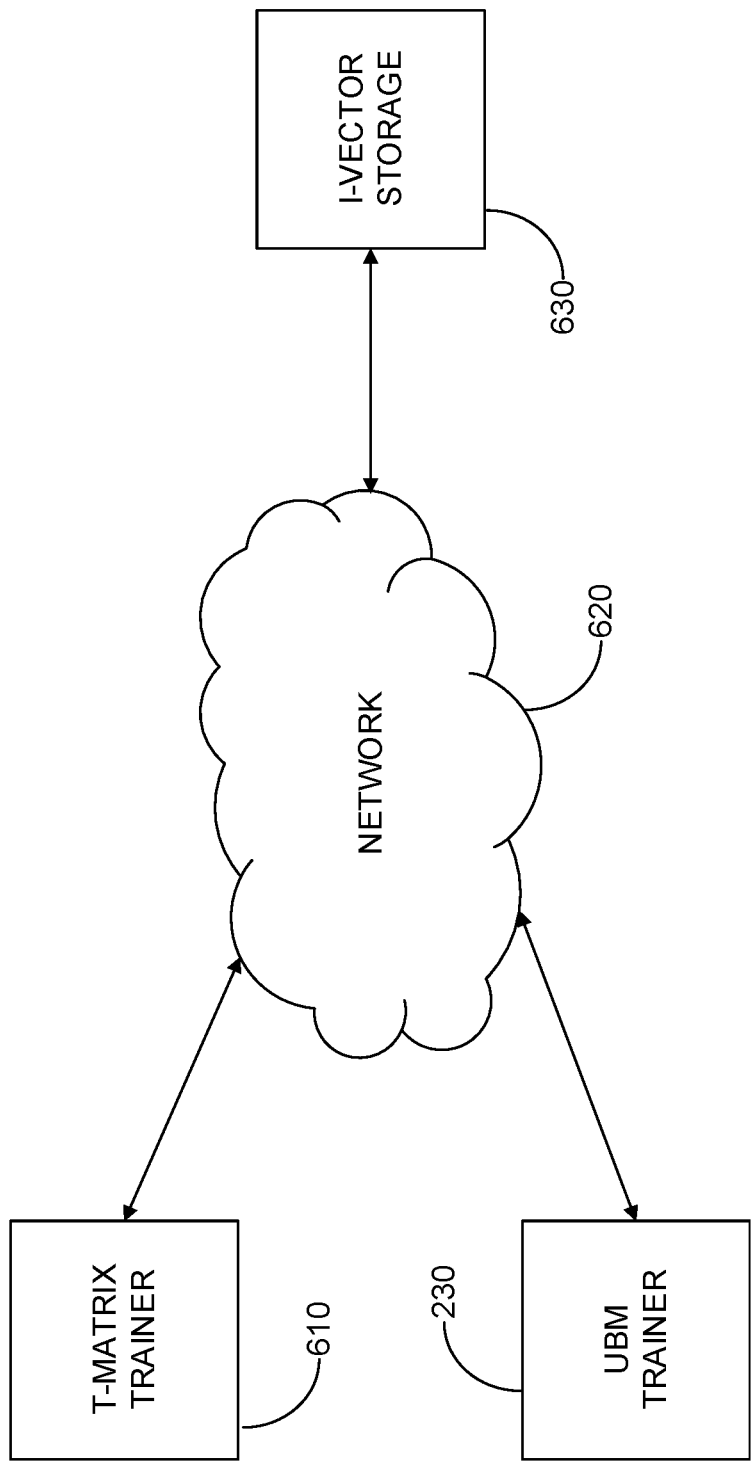
FIG. 6 is a schematic illustration of a speaker recognition training system based on a UBM according to an embodiment.

FIG. 6 is an example schematic illustration of a speaker recognition training system based on a UBM according to an embodiment. One example method of speaker recognition involves joint factor analysis (JFA). Based on such a JFA model, a speaker can be represented by a GMM which can be decomposed as:

$$s = m + Vy + Ux + Dz$$

where s is a speaker supervector, m is a speaker independent supervector (typically derived from the UBM), V is an eigenvoice matrix, y is a vector of speaker dependent factors, U is an eigenchannel matrix, x is a vector of channel dependent factors, D is a residual matrix, and z is a vector of speaker specific residual factors. One of ordinary skill would be familiar with the definitions and utilizations of eigenvoice matrix and eigenchannel matrix.

In this embodiment, the eigenvectors represented by each matrix V, U, and D can be thought of as being combined by speaker and/or channel dependent components y, x, and z respectively. Studies have found that the channel dependent factors may also contain speaker dependent information. Another approach to the JFA model is therefore:

$$s = m + Tw$$

where, s is the speaker supervector, m is the speaker independent supervector, T is the total variability matrix, and w represents a vector containing the total factors, also known as 'Identity Vector' or i-vector. Each total factor in an i-vector controls an eigen-dimension of the T-matrix.

A T-matrix needs to be trained, for example, by a T-matrix trainer 610. The T-matrix trainer 610 may be communicatively coupled via a network 620 to a UBM trainer 230, and a speaker database (e.g., database 210, FIG. 2). It should be noted that the T-matrix training requires a trained UBM, which may be performed by the methods detailed above. The T-matrix trainer may also be communicatively coupled with an i-vector storage 630, having stored therein a plurality of i-vectors. A method of utilizing the T-matrix trainer 610 is discussed in more detail in FIG. 7.

In an embodiment, the network 620 may be configured to provide connectivity of various sorts, as may be necessary, including but not limited to: wired and/or wireless connectivity, including, for example, local area network (LAN), wide area network (WAN), metro area network (MAN), worldwide web (WWW), Internet, computer telephony integration (CTI) systems, and any combination thereof, as well as cellular connectivity. The i-vector storage 630 is operative for receiving an audio input which includes one or more human speakers, extracting therefrom speaker features, such as MFC coefficients, and generating an i-vector based on the MFC coefficients and a trained UBM.

Figure 7:
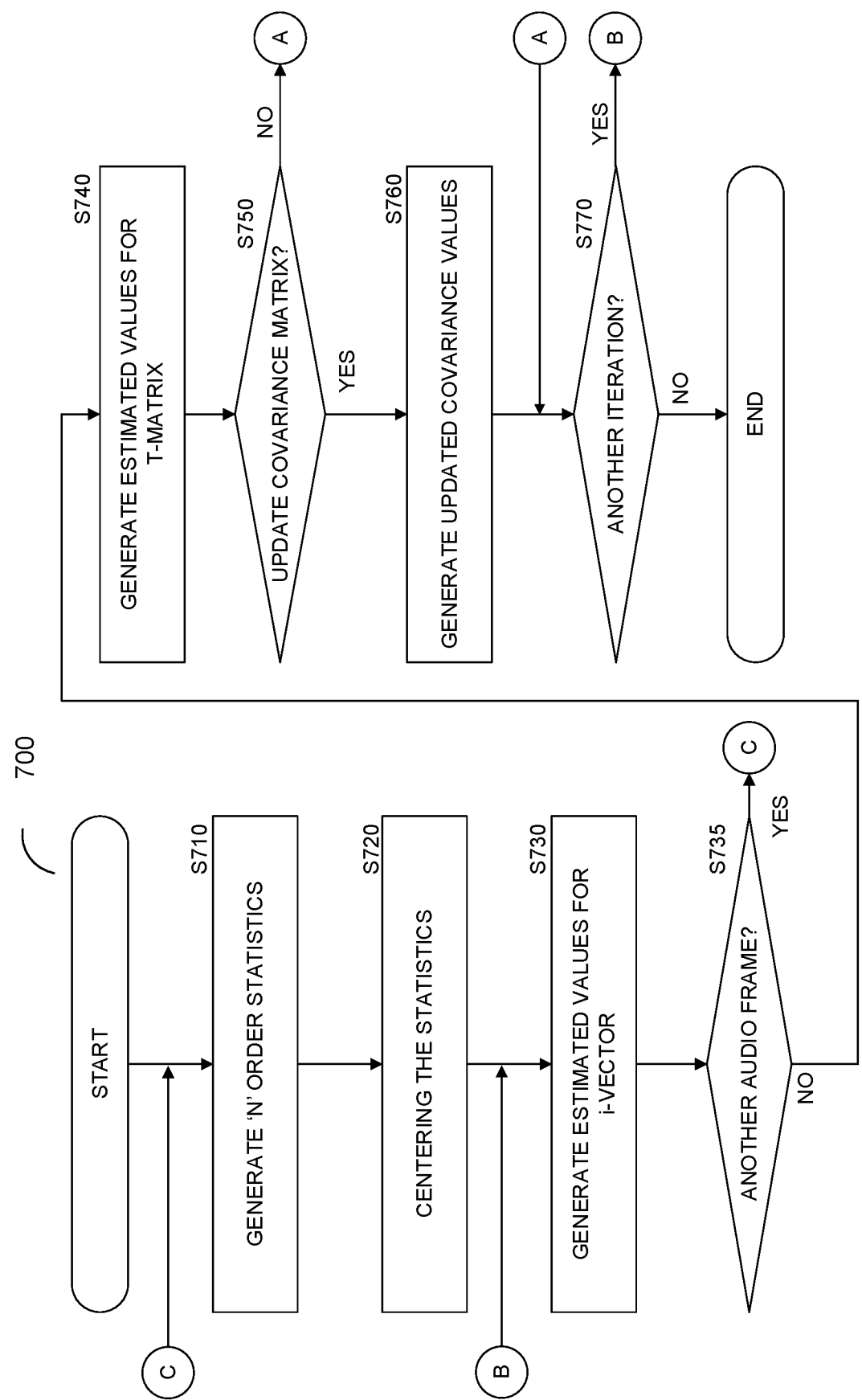
FIG. 7 is a flowchart of a method for training a T-matrix speaker recognition system according to an embodiment.

FIG. 7 is an example flowchart 700 of a method for training a T-matrix speaker recognition system according to an embodiment. For audio data from speaker s containing multiple audio frames t, the T-matrix trainer 610 should first generate '$n^{th}$' order statistics (where 'n' is greater than or equal to 2), at S710.

For example, the T-matrix trainer 610 may generate three orders (n=3) of Baum Welch Statistics by performing the following equation:

$$0^{th} \text{ order: } N_c(s) = \Sigma_{t \in s} \gamma_t(c)$$

where $\gamma_t(c)$ is the posterior of Gaussian component c of a GMM for observation t (e.g. MFCC's for audio frame t) of speaker s, $$1^{st} \text{ order: } F_c(s) = \Sigma_{t \in s} \gamma_t(c) Y_t$$

where $Y_t$ is a feature vector representing observation t (e.g. MFCCs for frame t);

$$2^{nd} \text{ order: } S_c(s) = \text{diag}(\Sigma_{t \in s} \gamma_t(c) Y_t Y_t^*)$$

and where $Y_t^*$ is a Hermitian transposition of $Y_t$. Generating the statistics may be performed, in an embodiment, by iterating over multiple audio frames.

At S720, centering of the statistics is performed, for example, by the T-matrix trainer. In this example embodiment, the centering may be performed by configuring the processor to compute the following:

$$\tilde{F}_c(s) = F_c(s) - N_c(s) m_c$$

where $m_c$ is the mean for UBM component c, and $$\tilde{S}_c(s) = S_c(s) - \text{diag}(F_c(s) m_c^* + m_c F_c(s)^* - N_c(s) m_c m_c^*)$$

which is the centered $2^{nd}$ order statistic.

At S730, an estimate of the total factors w (or i-vector) is generated. The estimated value may be generated by:

$$\overline{w}(s) = l_T^{-1}(s) * T^{**} \Sigma^{-1} * FF(s)$$

where $$l_T(s) = I + T^{**} \Sigma^{-1} * NN(s) * T$$

and where $\Sigma^{-1}$ is the inverse of the UBM covariance matrix. In some embodiments, the $0^{th}$ and $1^{st}$ order statistics may be generated by a first device, and the $2^{nd}$ order statistics may be generated by a second device. In certain embodiments the second device may further perform the steps described above at S720 and S730. Thus, a first device having limited computing resources may generate lower order statistics (partial i-vector), and further computations (full i-vector) may be generated on another device, or devices, which may be implemented in a cloud-based computing environment. This achieves simpler deployment by requiring client devices (i.e., first device) to perform lightweight computer processing, and reduced maintenance by performing bulk computations at a dedicated machine, server, or cloud based computing environment (second device). This further achieves privacy and security, as only irreversible statistics are sent to the second device, without sending actual audio content. Bandwidth is also conserved in this way.

In an embodiment, the matrix T may be initialized with random values and with a final matrix computed within a predefined number of iterations. In some embodiments, FF(s) may be generated by stacking the centered first order statistics into a vector data structure. Likewise, in certain embodiments NN(s) may be generated by replicating each element of $N_c(s)$ by the number of the dimension of the feature vector to generate an element group, stacking each element group into a vector data structure, and using this vector data structure as the diagonal content of a diagonal matrix.

A resource optimizer, discussed in more detail below, may select an optimization scheme to generate $l_T(s)$ by performing an element-by-element operation between a vector containing the diagonal elements of NN(s) and each column of T. This computation is more efficient and consumes less memory.

In certain embodiments, the generation of $l_T(s)$ can be executed in parallel. It should be noted that element outcomes do not affect each other and can therefore be calculated independently. It should be further noted that disclosed optimization allows the calculation to be performed on an end device (such as a mobile phone) which has relatively low computing power and less available memory, when compared, for example, to a server.

At S735 a check is performed to determine if another audio frame (or another recording, in some embodiments) should be processed. If 'yes', execution returns to at S710, otherwise execution continues at S740.

At S740 an estimate is generated for the T-matrix by the T-matrix trainer. The T-matrix trainer may compute the following:

$$T = \begin{bmatrix} T_1 \\ \vdots \\ T_c \end{bmatrix} = \begin{bmatrix} C_1 * A_1^{-1} \\ \vdots \\ C_C * A_C^{-1} \end{bmatrix}$$

where $T_1$ through $T_c$ are block matrix components of T corresponding to each GMM component, and $C_1$ through $C_c$ are block matrix components of C corresponding to each GMM component. Further, the following notation is useful:

$$N_c = \sum_s N_c(s)$$

$$A_c = \sum_s N_c(s)\left(l_T^{-1}(s) + w(s) * w'(s)\right)$$

$$C = \sum_s FF(s) * \left(l_T^{-1}(s) * T^* * \sum^{-1} * FF(S)\right)^*$$

$$NN = \sum_s NN(s)$$

At S750 a check is performed if the covariance matrix should be updated. If 'yes' execution continues at S760, otherwise execution continues at S770.

At S760, values are generated for the covariance matrix, for example, by computing the following:

$$\sum = NN^{-1}\left(\left(\sum_s SS(s)\right) - \text{diag}(C * T^*)\right)$$

where SS(s) is generated by stacking the second order statistics into a vector data structure and using this vector data structure as the diagonal content of a diagonal matrix.

At S770 a check is performed to determine if another iteration should be performed. If 'yes', execution continues at S730, otherwise execution terminates.

According to some embodiments disclosed herein, in the T-Matrix trainer may include a T-matrix resource optimizer. This would allow to save on computational resources.

A resource optimizer may initiate a first optimization by instructing the processor to generate any product of the covariance matrix (e.g., multiplying the delta matrix and inverse covariance matrix), by eliminating the diagonal covariance matrix data structure. Rather than instructing a processor of the T-matrix trainer to process the product of two matrixes in a naïve manner, the resource optimizer may instruct the processor to only compute those values where the diagonal elements of the covariance matrix are involved. Thus, the processor avoids performing a plurality of calculations which would merely yield a zero result. By avoiding processing these data values, the T-matrix trainer uses less processor resources, and thus less memory is required to generate intermediate computations and store results, as only meaningful (e.g., non-zero) results are stored.

In some embodiments, the resource optimizer may initiate a second optimization. In an embodiment, the second optimization may include generating new data structures, such data structures comprising a plurality of GMM components, also referred to as a multi-dimensional data array. The multi-dimensional data arrays may include two or more of the GMM components. Such data structures may be of a data size of 'n' by '1' for GMM weights, and 'n' by 'D' for GMM means and covariances, where 'n' is an integer equal to the number of GMM components, and 'D' is an integer equal to the number of coefficients in each MFCC frame. The resource optimizer may then instruct the processor to execute necessary computations between the multi-dimensional data arrays, and a MFCC matrix generated by replicating the current MFCC vector (relating to a single audio frame) in a 'n' by 'D' matrix. In certain computing environments, this single cycle calculation may be performed by the processor faster than executing multiple cycles ("for" loop) each having a single calculation.

In some embodiments, the resource optimizer may initiate a third optimization by instructing a general purpose GPU (GPGPU), or other type of parallel processor, to perform this computation. For example, as there is a computation performed which involves two identical GMM components, it may be advantageous to perform a computation between each MFCC matrix (which are different from one another) and the GMM data structures (which are the same for multiple MFCC Matrices) in parallel threads.

In yet another embodiment, the resource optimizer may initiate a fourth optimization. The fourth optimization includes identifying all intermediate matrix results that need to be diagonalized, and eliminating the computation of all off-diagonal elements. By eliminating the computation of off-diagonal matrix elements, the resource optimizer allows the processor to reduce computation cycles, while simultaneously saving memory space by not storing results of computations which would not factor in to the end result in an impactful way.

In yet another embodiment, the resource optimizer may initiate a fifth optimization, which includes detecting common precomputable elements in the required computations between GMM data structures and the MFCC matrix. The resource optimizer may detect a recurring computation, and generate a precomputed value for such recurring computations. For example, a recurring computation can occur within a loop. By detecting such recurring computations (and for example storing them in a processor cache), generating a product outside of the loop and using the product within the loop, the processor performs less calculations per loop cycle, thereby reducing computation and decreasing total processing time.

In other embodiments, the resource optimizer may initiate a sixth optimization, which includes detecting a processor output generated by performing a computation between a first matrix (such as an MFCC matrix) and a second matrix (such as UBM mixture components) and generating the output by performing an element-by-element operation between the two matrices (or between a vector and matrix, where applicable).

In certain embodiments, the resource optimizer may perform any one or more of the above-mentioned optimizations.

Figure 8:
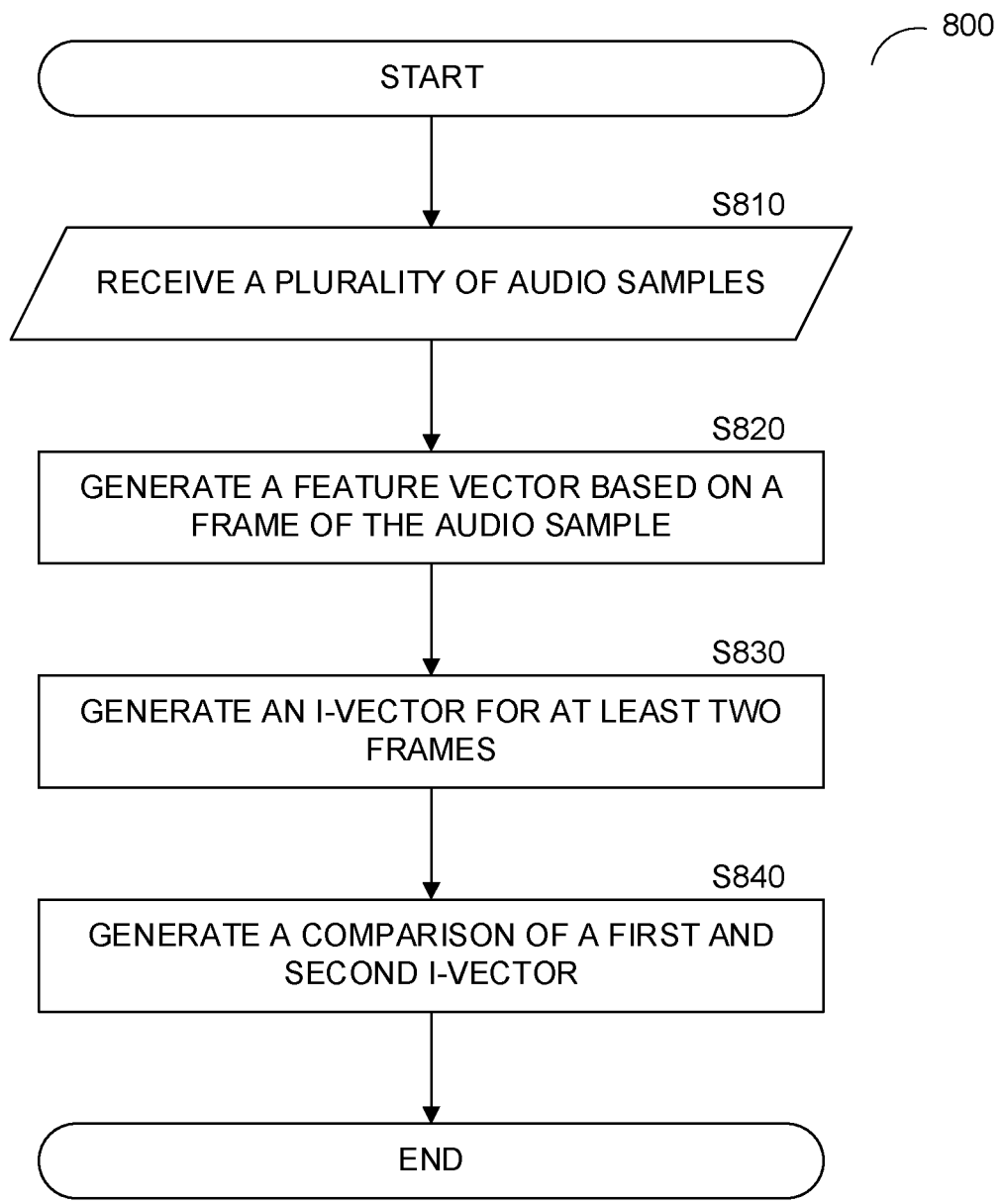
FIG. 8 is a flowchart of a method for determining an i-vector match between a first and second speaker according to an embodiment.

FIG. 8 is an example flowchart 800 of a method for determining an i-vector match between a first and second speaker.

At S810 a plurality of audio samples is received: each audio sample including a human speaker.

At S820, at least one feature vector is generated based on at least one frame of each audio sample, including therein a sample of a human speaker.

At S830, an i-vector is generated per audio sample, based on the UBM, the T-matrix and at least one feature vector from that audio sample, for example as detailed in FIG. 7 above, and in particular with respect to S730. In some embodiments it may be useful to perform channel compensation on the i-vectors. This can be performed by techniques known in the art, such as LDA (linear discriminant analysis) and WCCN (within-class covariance normalization).

At S840, a score is generated between a first i-vector and second i-vector of the plurality of i-vectors. The score may be generated for example by computing the following:

$$\text{score}(w_1 w_2) = \frac{w_1^* * w_2}{\|w_1\| * \|w_2\|}$$

which is a cosine distance score. A higher score ('1' being highest) indicates the i-vectors are highly correlated to the same speaker, whereas a lower score ('−1' being lowest) indicates that two i-vectors are probably generated from different speakers.

Figure 9:
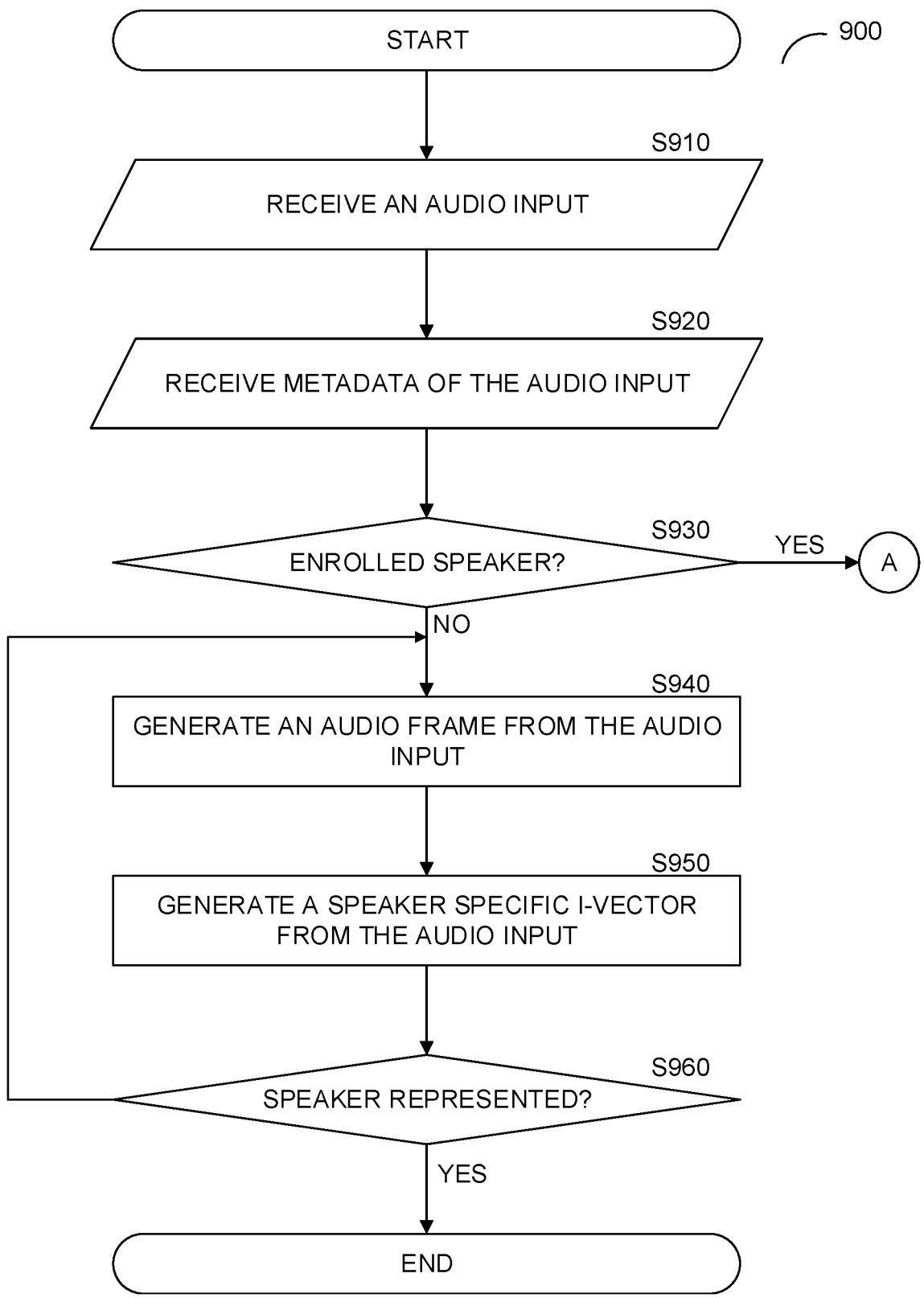
FIG. 9 is a flowchart of a computerized method for speaker enrollment, according to an embodiment.

FIG. 9 is a non-limiting exemplary flowchart 900 of a computerized method for speaker enrollment, implemented in accordance with an embodiment.

At S910, an audio input is received by a system, such as authentication system of FIG. 12 below. In some embodiments, the system receiving the audio input may be an end device, such as a mobile phone. In some embodiments, the system of FIG. 12 may perform authentication, identification, or a combination thereof.

At S920, metadata is received based on the audio input. In some embodiments, metadata may be determined (or generated). For example, metadata may be a caller number, phone make and model, IP address (for VoIP calls) software version and the like.

At S930, a check is performed to determine if the metadata matches metadata of an enrolled speaker, in an enrolled speaker database. The enrolled speaker database may include, for example, a plurality of i-vectors, so that one or more i-vectors corresponds to one or more metadata elements. For example, a single phone number may be associated with a plurality of i-vectors, each corresponding to a single human speaker. If the metadata matches metadata of an enrolled speaker, execution continues at S1030 of FIG. 10, otherwise execution continues at S940. In some embodiments, execution may continue at S1130 of FIG. 11 instead of S1030 of FIG. 10, whether there was a metadata match or not (e.g. in case of identification, rather than authentication). A match may be an exact match, or a match that is within a match range of values.

At S940, at least an audio frame is generated from the audio input. Generation of the audio frame may be in response to a voice activity detector (VAD) indicating that a speaker is speaking.

At S950, a speaker specific i-vector is generated based on: the audio frame, a trained UBM, and a trained T-matrix. The T-matrix and UBM may be trained by the methods detailed above. In some embodiments, i-vector generation may occur on the user device (mobile phone, computer device, edge computing device and the like), on the central authentication system, or on a combination thereof. In embodiments where i-vector generation is performed on the mobile device (or other end/edge devices), a trained T-matrix and a trained UBM may be made available to the mobile device. For example, an end device may download (periodically, or otherwise) a trained T-matrix and/or trained UBM for performing the methods described herein. The speaker specific i-vector may be updated based on additional audio frames.

At S960, an optional check may be performed to determine if the speaker specific i-vector is representative of the speaker. For example, this can be done by generating the speaker specific i-vector from one part of the audio input, and attempting to perform an i-vector match (for example as described in more detail with respect to FIG. 8) between the speaker specific i-vector and a second i-vector generated from a second audio frame. If 'no', the i-vector may be updated by continuing execution at S940. If 'yes', execution ends.

It should be noted that the i-vector may include, in addition to features which pertain to the speaker, features which pertain to the channel through which the speaker was speaking (i.e., the specific audio channel). The features of the audio channel may allow to distinguish, for example, the same speaker over different mediums (phone call vs. VoIP call), or different devices (specific model of mobile phone, model of end device, etc.). In some embodiments, the channel specific features may be used as either a further mode of authentication, identification, or both. The generated i-vector and metadata may be associated with an enrolled speaker account (index, or other identifiers), and stored for example in an i-vector storage.

Figure 10:
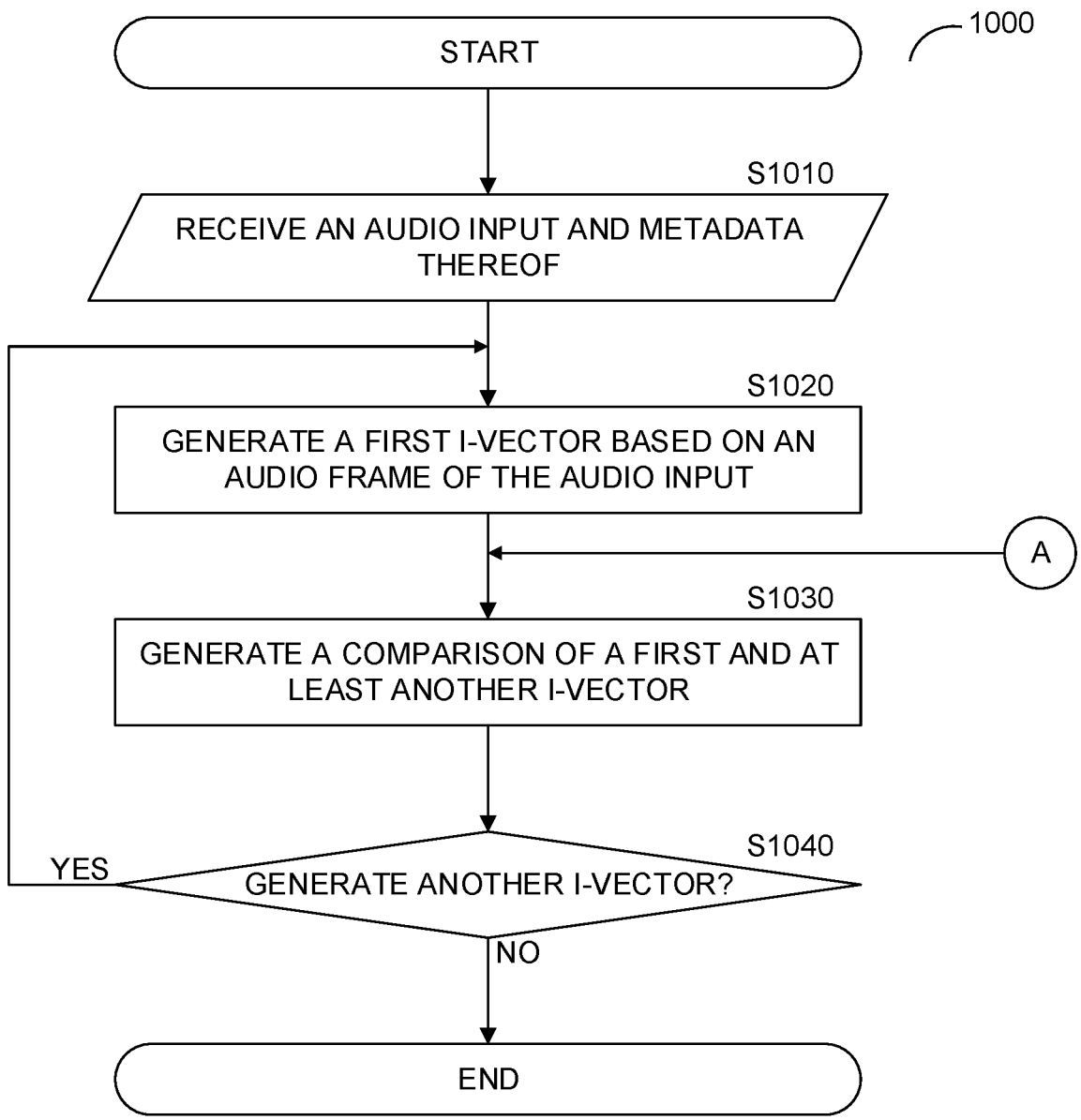
FIG. 10 is a flowchart of a computerized method for authenticating a speaker in a speaker enrolled authentication system, according to an embodiment.

FIG. 10 is a non-limiting exemplary flowchart 1000 of a computerized method for authenticating a speaker in a speaker enrolled authentication system, implemented in accordance with an embodiment.

At S1010, an audio input and metadata element(s) thereof are received. In some embodiments, the audio input may be received by an authentication system, such as the authentication system described in more detail in FIG. 12. In other embodiments, the audio input may be received by an end device (or edge device, used interchangeably), which performs all or part of the method described herein. The metadata may include any of: a caller identifier (such as phone number, ANI, IMEI number, and IMSI number), end device make and model, IP address, MAC address, software version (for VoIP calls), and the like.

At S1020, a first i-vector is generated based on an audio frame of the audio input. The i-vector may be generated by the end device, by the authentication system, or in some embodiments, both. In some embodiments, the first i-vector may be generated based on a plurality of audio frames.

At S1030, the first i-vector is compared with at least another i-vector selected from a database (or other storage) of enrolled speakers, such that each another i-vector is associated with one or more metadata elements. In some embodiments the i-vector may be (fully or partially) generated by the end device, and the comparison performed by an authentication system. In such embodiments, the end device may send the generated i-vector to the authentication system. By generating, at least partially, the i-vector on the end device, at no point is the authentication system required to have direct access to the audio input, which may reduce cost, and in some jurisdictions, better comply with privacy protection laws, for example. In some embodiments where a speaker is determined to be enrolled, the audio input and/or the first i-vector maybe used to generate a secondary i-vector. In certain embodiments, first i-vector and the another i-vector may both be stored and associated with an enrolled speaker.

At S1040, a check is performed to determine if another i-vector should be generated. If 'yes' execution continues at S1020, otherwise execution terminates. Another i-vector should be generated if for example the comparison between the first i-vector and the another i-vector did not yield a result which exceeded the threshold for authentication. In other embodiments, a certain number of i-vector generations (i.e., iterations) may be required before the authentication system is configured to authenticate the caller. In some embodiments, the authentication process may be ongoing, occur periodically, or otherwise as may be defined.

Figure 11:
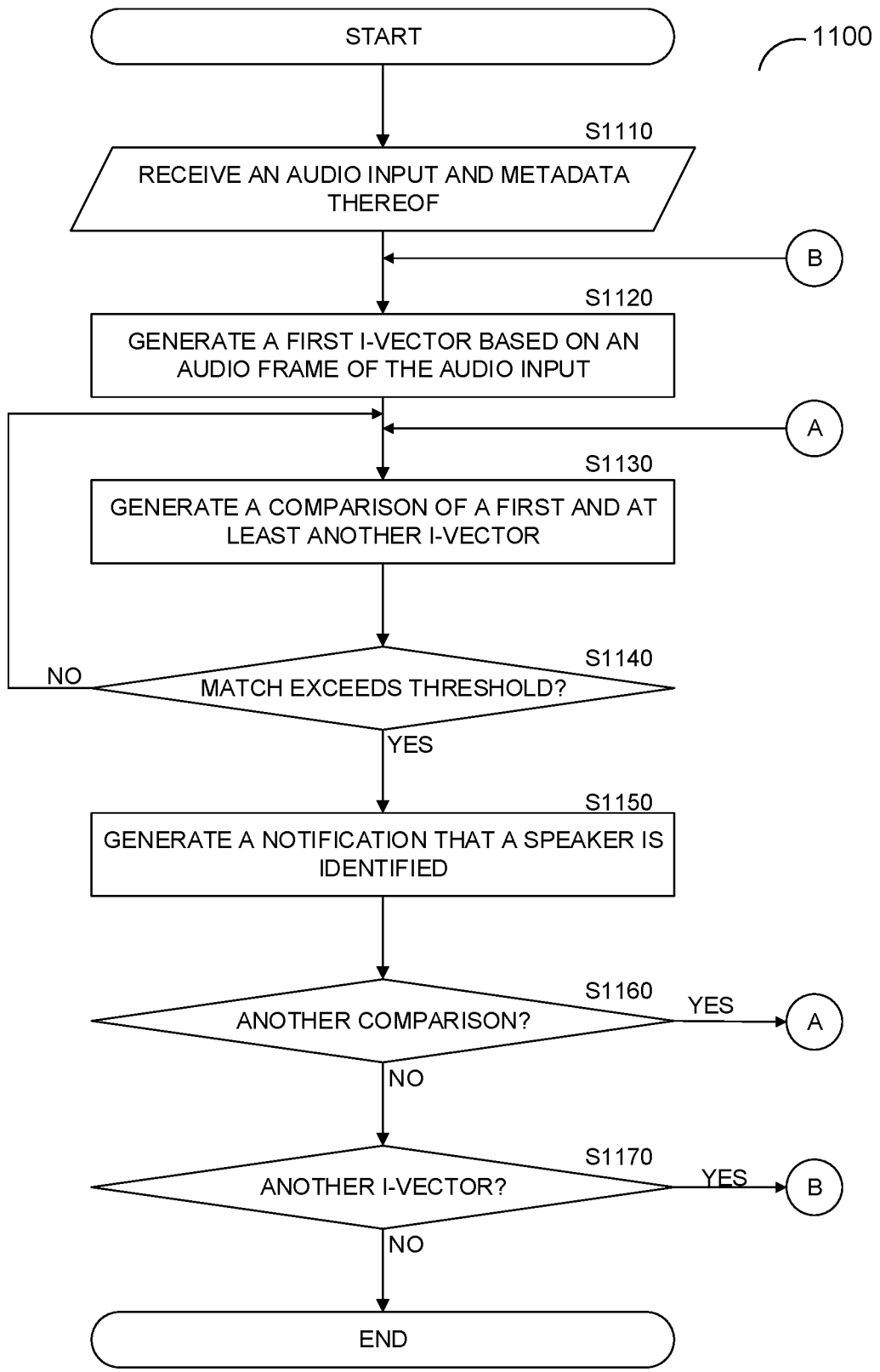
FIG. 11 is a flowchart of a computerized method for identifying a speaker in a speaker enrolled identification system, according to an embodiment.

FIG. 11 is a non-limiting exemplary flowchart 1100 of a computerized method for identifying a speaker in a speaker enrolled identification system, implemented in accordance with an embodiment.

At S1110, an audio input and metadata element(s) thereof are received. In some embodiments, the audio input may be received by an identification system, such as the identification system described in more detail in FIG. 12. In other embodiments, the audio input may be received by an end device, which performs all or part of the method described herein. The metadata may include any of: a caller identifier (such as phone number, ANI, IMEI number, and IMSI number), end device make and model, IP address, MAC address, software version (for VoIP calls), and the like.

At S1120, a first i-vector is generated based on an audio frame of the audio input. The i-vector may be generated by the end device, by the identification system, or a combination thereof. In some embodiments, the first i-vector may be generated based on a plurality of audio frames.

At S1130, the first i-vector is compared with at least another i-vector selected from a database (or other storage) of enrolled speakers. In some embodiments the i-vector may be (fully or partially) generated by the end device, and the comparison performed by an identification system. In such embodiments, the end device may send the generated i-vector to the identification system. By generating, at least partially, the i-vector on the end device, at no point is the identification system required to have direct access to the audio input, which may reduce cost, and in some jurisdictions, better comply with privacy protection laws, for example. In some embodiments where a speaker is determined to be enrolled, the audio input and/or the first i-vector maybe used to generate a second i-vector. In certain embodiments, first i-vector and the second i-vector may both be stored and associated with an enrolled speaker.

At S1140, a check is performed to determine if the comparison yields a match exceeding a first threshold. A threshold may be predetermined, for example, or may be adjusted in response to the metadata (e.g., if identification can be performed with metadata, threshold may be lower). If 'no' execution may continue at S1130. If 'yes' execution continues at S1150.

At S1150, a notification is generated by the identification system to indicate that the speaker has been identified. The notification may include the metadata, or data accessible to the identification system as part of the enrolled speaker data. In some embodiments, the notification may include a confidence level indicating the probability that the speaker is indeed the identified speaker.

At S1160, an optional check is performed to determine if another comparison should be generated. If 'yes' execution continues at S1130, if 'no' execution continues at S1170.

At S1170, an optional check is performed to determine if another i-vector should be generated. This may allow, for example, to enhance a generated i-vector with additional data points (extracted features) and therefore provide for more accurate identification. In some embodiments the first i-vector may be matched with every i-vector in the i-vector storage (i.e., perform a match comparison between the speaker and all enrolled speakers). In certain embodiments, the first i-vector may be matched with (i.e., identified against) a subset of the total enrolled speakers. In an embodiment, the subset may be determined based on the metadata.

Figure 12:
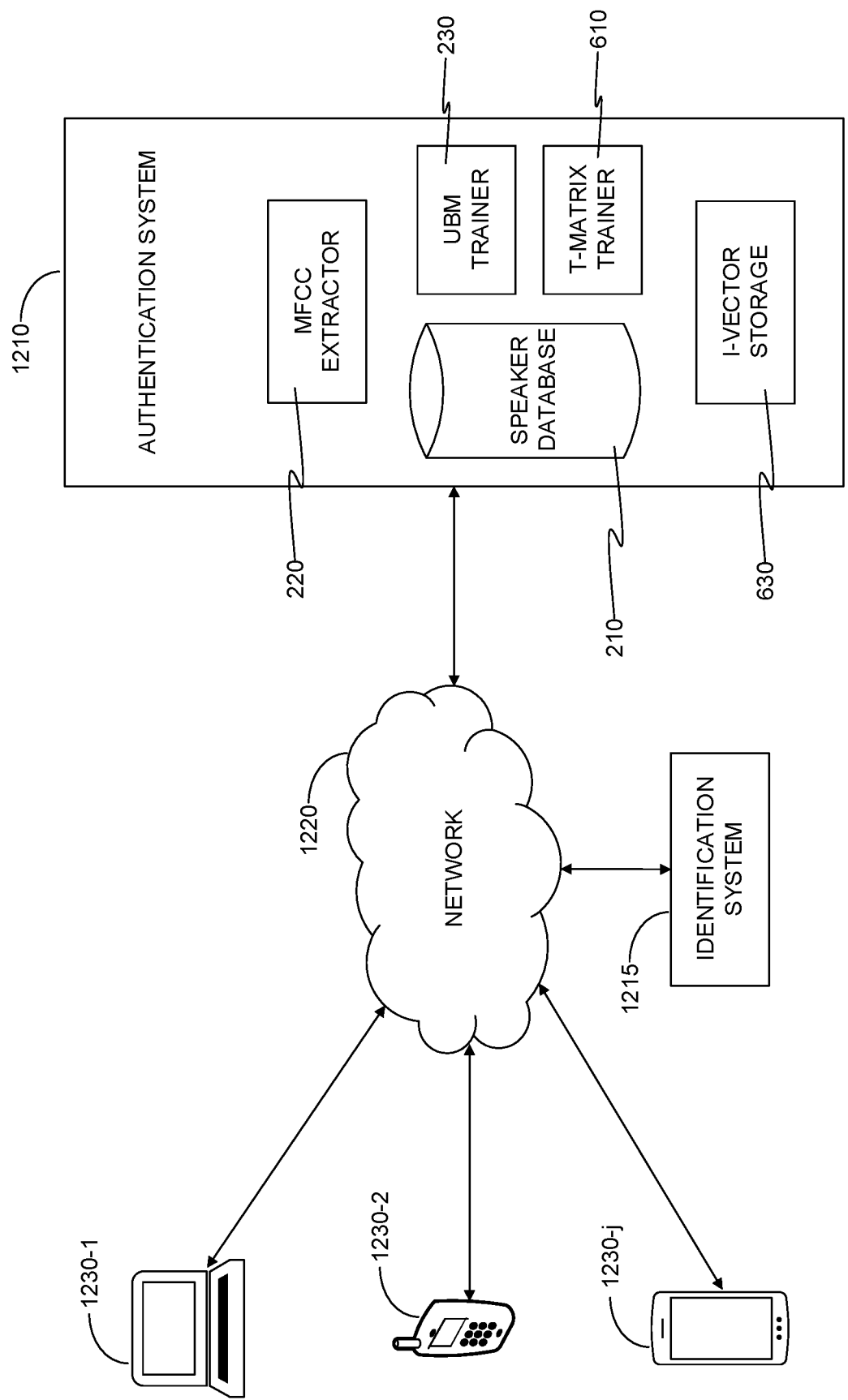
FIG. 12 is a schematic illustration of a speaker-based voice authentication and identification systems, according to an embodiment.

FIG. 12 is a non-limiting exemplary schematic illustration of a speaker-based voice authentication 1210 and identification systems 1215, implemented in accordance with an embodiment. An authentication system 1210 and identification system 1215 are communicatively coupled with a network 1220. A network 1220 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, computer telephony integration (CTI) systems, and any combination thereof, as well as cellular connectivity.

The network 1220 further provides connectivity for a plurality of end user devices 1230-1 through 1230-j, where 'j' is an integer having a value of '1' or greater. An end user device may be, for example, a computer device 1230-1, a mobile phone 1230-2, a smartphone or other communication device executing voice over IP (VoIP) software 1230-j, a server running call center software, a voice-activated personal assistant device, and the like.

The end user devices 1230, the identification system 1215, and/or the authentication system 1210 may further include a voice activity detector (not shown), which is configured to detect when an audio input includes a human speaker. In this embodiment, the authentication system 1210 further includes an MFCC extractor 220, a speaker database 210, a UBM trainer 230 and a trained UBM (not shown) generated by the UBM trainer 230, a T-matrix trainer 610 and a trained T-matrix (not shown) generated by the T-matrix trainer 610, and an i-vector storage 630, which includes therein a plurality of i-vectors, each corresponding to an enrolled speaker, and to one or more metadata elements. In some embodiments, an MFCC extractor 220 may be implemented on the end user device 1230, on the authentication system 1210, the identification system 1215, or any combination thereof.

In this exemplary embodiment, a first human speaker receives a call on a first end device 1230-1 from a second human speaker on a second end device 1230-2. In some embodiments, the first end device 1230-1 (or second end device 1230-2) is part of a call center, and the call may be forwarded through one or more call center systems (not shown). The authentication system 1210 or the end devices may initiate an authentication session. In this example, the authentication system 1210 initiates the authentication session with first end device 1230-1. The first end device 1230-1 generates a first i-vector from audio input of the second human speaker. This may be performed before connecting the call with the first human speaker (for example by voice navigating a call center) or after connecting the call with the first human speaker (i.e., first end device 1230-1). The first end device 1230-1 includes a version of the T-matrix and UBM generated by the authentication system 1210, which is used to generate i-vectors. When generating i-vectors, a number of optimizations may be performed. The optimizations are discussed in more detail above.

A speaker may be enrolled in the authentication system 1210, for example by associating the speaker with a user account. User enrollment may include generating a user account, which may be associated with passwords, passphrases, identifiers (such as social security number, ID number, passport number, credit card number, bank account, and the like), security questions, metadata related to the user (such as phone number, IMEI, IMSI, end device make and model, etc.) and the like. Speaker enrollment may include associating the user account with one or more i-vectors generated by the end user device, by the authentication system, or both. Generating i-vectors for speaker enrollment is discussed in more detail in FIG. 9 above.

If a speaker is enrolled in the authentication system 1210, the authentication system 1210 generates a matching score between a first i-vector received from the first user device (or in other embodiments generated by the authentication system based on audio received from the first user device) and a second i-vector from the enrolled speaker database. The match generation is discussed in more detail above with respect to FIG. 8. In certain embodiments, the second i-vector is selected so that metadata associated with the first i-vector and second i-vector match (i.e., same MEI). In some embodiments, the first i-vector may be used to generate a match with a group of second i-vectors, or all the i-vectors stored in the identification system 1215. If the authentication (or identification) was successful, the authentication (or identification) system may send a notification to the first user device 1230-1 that the second speaker was successfully authenticated (identified).

In case of performing identification, the identification system 1215 may further indicate a plurality of i-vectors (and associated enrolled speakers, or metadata thereof) to which the match exceeded a threshold. In some embodiments, the identification system 1215 and authentication system 1210 may be implemented as one system. The identification system 1215 and authentication system 1210 typically include similar components (i.e., MFCC extractor, speaker database, a UBM trainer and a trained UBM, a T-matrix trainer and a trained T-matrix, and an i-vector storage, which includes therein a plurality of i-vectors, each corresponding to an enrolled speaker, and to one or more metadata elements). It should be readily understood that the thresholds for identification and authentication are not necessarily the same values, and each may be adapted depending on circumstance and/or user intervention.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for securely authenticating a speaker between a caller device and a first device, comprising:
generating a user account including a user identifier based on at least one metadata element received from a caller device associated with an audio input;
receiving a partial i-vector generated by the first device based on at least the audio input;
generating a full i-vector based on the partial i-vector; and
associating the user account with the full i-vector, wherein generating the full i-vector utilizes an optimized computation including: generating a feature matrix based on a feature vector; generating a Gaussian Mixture Model (GMM) mean matrix based on a plurality of mean vectors associated with a plurality of GMM components; and generating a delta matrix based on the feature matrix and the GMM mean matrix.

2. The method of claim 1, further comprising:
generating the partial i-vector from an audio frame of the audio input, and a trained T matrix.

3. The method of claim 1, wherein the optimized computation further comprises:
generating a first multi-dimensional array comprising a plurality of duplicated matrices, each matrix comprised of a plurality of GMM mean vectors;
generating a multi-dimensional feature matrix, comprising a plurality of feature matrices, each feature matrix corresponding to a feature vector of a single audio frame; and
generating a multi-dimensional delta array based on the first multi-dimensional array and the multi-dimensional feature matrix.

4. The method of claim 1, wherein the optimized computation further comprises:
detecting diagonal matrices; and
performing only those computations that involve diagonal elements.

5. The method of claim 1, wherein the optimized computation further comprises:
detecting computations in an intermediate result that generate an off-diagonal element of a matrix which is diagonalized; and
eliminating the computation of the intermediate result.

6. The method of claim 1, wherein the optimized computation further comprises:
detecting a recurring computation;
precomputing the recurring computation; and
storing a precomputed result in a cache of a processor.

7. The method of claim 1, wherein the optimized computation further comprises:
detecting a computation between a first matrix and a second matrix; and
replacing the detected computation with an element-by-element computation between the first matrix and the second matrix in response to determining that the replacement will result in the same output.

8. The method of claim 1, wherein the metadata elements are any of: phone number, Automatic Number Identification (ANI), personal identifier number, International Mobile Equipment Identity (IMEI), International Mobile Subscriber Identity (IMSI), end device make, and end device model.

9. The method of claim 1, further comprising:
generating a user account in response to determining that the full i-vector is not associated with an existing user account.

10. The method of claim 1, further comprising:
extracting channel features from the audio input; and
generating the full i-vector further based on the extracted channel features; and
associating the extracted channel features with the generated user account.

11. The method of claim 1, further comprising:
receiving a second partial i-vector and associated metadata;
generating a second full i-vector based on the second partial i-vector; and
generating a match score between the second full i-vector and the full i-vector.

12. The method of claim 11, further comprising:
generating a notification that a speaker is authenticated, in response to the match score exceeding a first threshold value; and
generating a notification that the speaker is not authenticated, in response to the match score being below a first threshold.

13. A non-transitory computer readable medium having stored thereon instructions for causing a processing circuitry to perform a process, the process comprising:
generating a user account including a user identifier based on at least one metadata element received from a caller device associated with an audio input;
receiving a partial i-vector generated by a first device based on at least the audio input;
generating a full i-vector based on the partial i-vector; and
associating the user account with the full i-vector, wherein generating the full i-vector utilizes an optimized computation including: generating a feature matrix based on a feature vector; generating a Gaussian Mixture Model (GMM) mean matrix based on a plurality of mean vectors associated with a plurality of GMM components; and generating a delta matrix based on the feature matrix and the GMM mean matrix.

14. A system for securely authenticating a speaker between a caller device and a first device, comprising:
a processing circuitry; and
a memory, the memory containing instructions that, when executed by the processing circuitry, configure the system to:
generate a user account including a user identifier based on at least one metadata element received from a caller device associated with an audio input;
receive a partial i-vector generated by the first device based on at least the audio input;
generate a full i-vector based on the partial i-vector; and
associate the user account with the full i-vector, wherein generating the full i-vector utilizes an optimized computation including: generating a feature matrix based on a feature vector; generating a Gaussian Mixture Model (GMM) mean matrix based on a plurality of mean vectors associated with a plurality of GMM components; and generating a delta matrix based on the feature matrix and the GMM mean matrix.

15. The system of claim 14, wherein the memory contains instructions that when executed by the processing circuitry further configure the system to:
extract channel features from the audio input; and
generate the full i-vector further based on the extracted channel features; and
associate the extracted channel features with the generated user account.

16. The system of claim 14, wherein the memory contains instructions that when executed by the processing circuitry further configure the system to:
extract features into a feature matrix from an incoming audio call;
generate a partial i-vector, wherein the partial i-vector includes a first low-order statistic;
send the partial i-vector to an authentication server; and
receive from the authentication server a match score generated based on a full i-vector and another i-vector being stored on the authentication server, wherein the full i-vector is generated from the partial i-vector.

17. The system of claim 16, wherein the memory contains instructions that when executed by the processing circuitry further configure the system to:
send metadata associated with a caller device to an authentication server; wherein the match score is further generated based on a match between the sent metadata, and metadata associated with the another i-vector.

18. The system of claim 14, wherein generating the partial i-vector is performed in response to detecting a voice by a voice activity detector (VAD) of the first device, the voice originating from a caller device.

19. The system of claim 14, wherein generating a partial i-vector is performed at a first frequency, and generating the full i-vector is performed at a second frequency, which is lower than the first frequency.

* * * * *